United States Patent

[11] 3,625,548

| [72] | Inventor | Frank J. Boehm |
| | | St. Louis, Mo. |
| [21] | Appl. No. | 66,280 |
| [22] | Filed | Aug. 24, 1970 |
| [45] | Patented | Dec. 7, 1971 |
| [73] | Assignee | Sharyl A. Craggs |
| | | Taylorville, Ill. |

[54] QUICK CONNECT AND DISCONNECT COUPLING
5 Claims, 7 Drawing Figs.

[52] U.S. Cl. .................................................. 285/27,
285/99, 285/311
[51] Int. Cl. ............................................. F16l 35/00
[50] Field of Search ........................................... 285/24, 27,
99, 35 L, 71, 311, 312, 70, 73, 74

[56] References Cited
UNITED STATES PATENTS

| 1,493,221 | 5/1924 | Northrup ...................... | 285/27 |
| 1,991,343 | 2/1935 | Boll .............................. | 285/311 X |

FOREIGN PATENTS

| 575,406 | 5/1959 | Canada ....................... | 285/352 |
| 435,269 | 10/1926 | Germany ...................... | 285/71 |
| 81,018 | 10/1919 | Switzerland ................. | 285/27 |

*Primary Examiner*—Dave W. Arola
*Attorney*—Davis, Lucas, Brewer & Brugman

ABSTRACT: Coupling has two tubular body sections. When assembled, the sections are axially aligned, with abutting, coextensive, resilient, rubberlike gasket rings providing a rubber-to-rubber seal. The body sections have open areas completely surrounding the gasket rings to prevent fouling of the seal by accumulation of foreign material. A detachable pivot on one side of the coupling and a detachable toggle on the other side hold the body sections assembled. The coupling is disassembled and the body sections separated by releasing the toggle. The body sections are aligned, automatically, during assembly, by the pivot, which restrains relative movement in one transverse direction, and guide lugs which restrain relative movement in another transverse direction. Compression of the gasket rings and hence effectiveness of the seal, is adjusted by a threaded connection between the toggle and one of the body sections.

INVENTOR
Frank J. Boehm
BY
Davis, Lucas, Brewer & Brugman
ATTORNEYS

PATENTED DEC 7 1971

INVENTOR
Frank J. Boehm
BY
Davis, Lucas, Brewer & Brugman
ATTORNEYS

QUICK CONNECT AND DISCONNECT COUPLING

BACKGROUND OF THE INVENTION

The field of this invention is generally a coupling for hose, or the like, of the class generally associated with Patent Office Classification No. 285.

The "Federal Coal Mine Health and Safety Act of 1969" has some very strict dust control regulations for coal mine atmospheres, and it is expected that regulations of this sort will be extended to a wide variety of industrial, construction, and material handling machinery in the near future, as essential environmental control measures.

One of the most effective and economical ways of reducing dust in the atmosphere around machinery of this kind is to use water sprays. Much of the mining, digging, and material working and handling equipment is special purpose, mobile machinery, each piece of which is moved in and out of the working location to perform a specific operation, such as drilling, roof bolting and cutting. Each such mobile machine is equipped with a set of sprays which must be connected to and disconnected from a water line at the working location. There is a need for a quick connect and disconnect coupling which can be used reliably in extremely dirty, gritty, sandy and muddy applications.

SUMMARY OF THE INVENTION

A general object of this invention is to provide a quick connect and disconnect coupling for hose, and the like, which may be reliably used in dusty and gritty environments.

A primary object is to provide such a coupling which can be instantly assembled and disassembled by a toggle, and which will hold high fluid pressures when assembled.

Another object is to provide such a coupling having a fluid seal interface between two rubberlike gasket rings which are sufficiently wide and resilient to absorb and envelop particles of trapped foreign matter such as sand and grit, without leaking at the interface.

Another object is to provide such a coupling which is automatically self-aligning so it can be assembled quickly and positively by inexperienced operators under poor light conditions, even in the dark, by touch alone;

Another object is to provide such a coupling having a completely free space encircling the gasket rings to avoid compacting foreign material against the outside of the gaskets or at their sealing interface.

Other objects and advantages will be apparent from the following description taken in connection with the drawings in which.

Like parts are designated by like reference numerals throughout the figures.

DESCRIPTION OF THE PREFERRED EMBODIMENT

Figure 1:
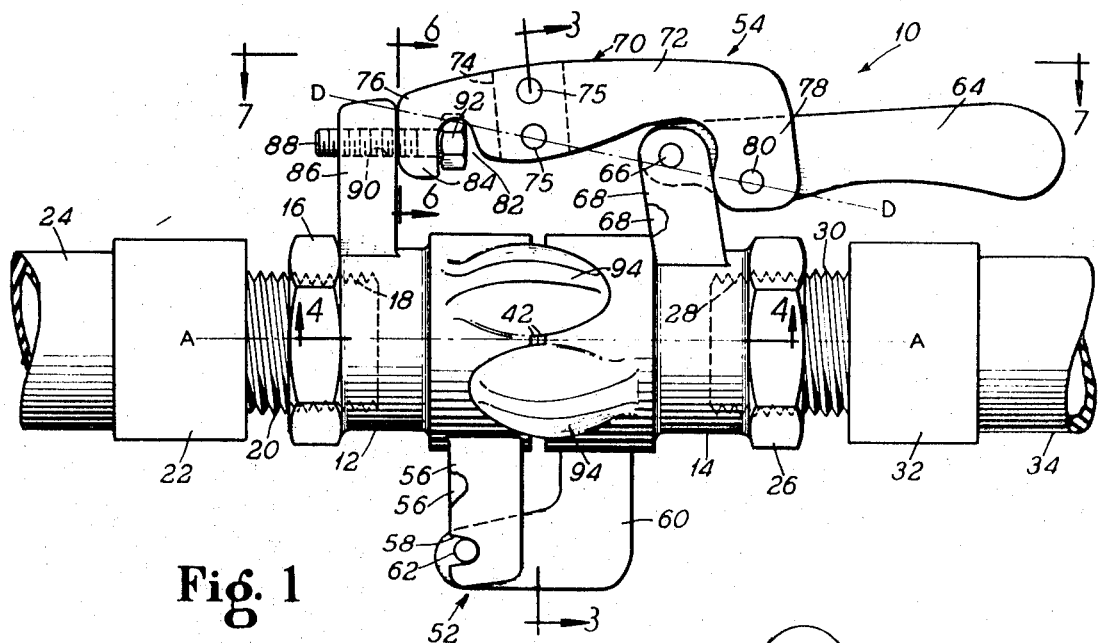
FIG. 1 is a side view of an assembled coupling illustrating a preferred form of the invention.
Figure 2:
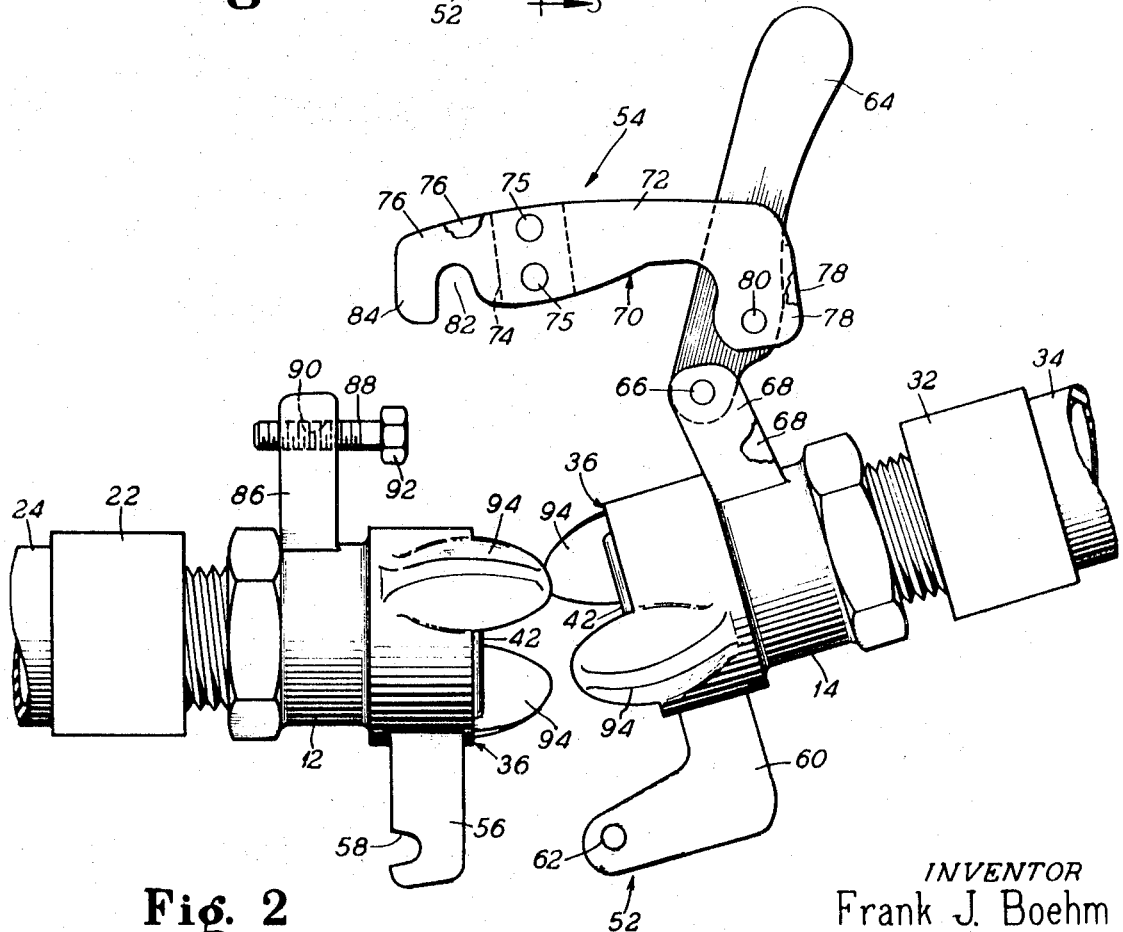
FIG. 2 is a side view of the coupling, disassembled.

The coupling generally designated 10 comprises a pair of body sections 12 and 14. Section 12 has an end socket 16 with internal pipe threads 18 engaging external pipe threads 20 on a fitting 22 at the end of a hose 24. Likewise, section 14 has an end socket 26 with internal pipe threads 28 engaging external pipe threads 30 on a fitting 32 at the end of a hose 34.

Figure 4:
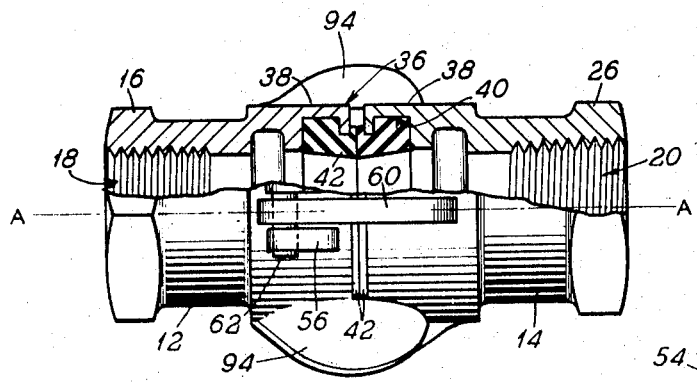
FIG. 4 is a partly cross-sectioned view of FIG. 1, taken along line 4—4.
Figure 5:
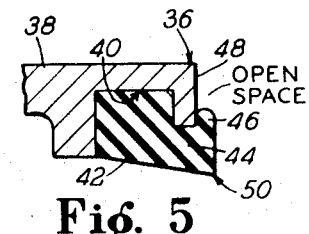
FIG. 5 is a fragmentary, enlarged view of FIG. 4.

As shown in FIGS. 1 and 4, the two body sections are assembled in confronting, end-to-end, abutting relation, and are aligned along axis A—A.

Each body section has an annular seat 36 at its confronting end portion 38. Behind each seat is an internal annular recess 40.

A resilient rubberlike gasket ring 42 has a main portion 44 in the recess 40, and an external face portion 46 in fluid sealing engagement with the inner portion of the seat 36. The gasket ring may be made of natural or synthetic rubber, or any suitable equivalent elastomeric material. The outer portion 48 of each sheet 36 is free and open completely around the gasket ring. This is important in preventing accumulation of foreign material on the outsides of the gasket rings and at the interfaces 50 between them.

Note that each rubberlike gasket ring 42 has a substantial thickness, axially, and extends forwardly of the seat 36. Thus, there is a substantial column of resilient material in these gasket rings for storing compressive stresses to seal the gasket interface 50 against leakage when the body sections are drawn together by the toggle means now to be described.

Detachable pivot means 52 and detachable toggle means 54 are provided on opposite sides of the coupling, in a longitudinal plane B—B which also includes the axis A—A.

The detachable pivot means 52 includes a pair of spaced ears 56, 56 extending transversely from the body section 12. The ears have open-ended slots 58. An L-shaped, transverse extension 60 on the body section 14 is slidably assembled between the ears 56, 56 and has a transverse pivot pin 62 detachably engageable within the slots 58, as shown in FIG. 1.

The detachable toggle means 54 includes a manually operable handle 64 pivoted to a pin 66 carried by spaced ears 68, 68 extending transversely from the body section 14. A composite tension link 70 is made of two identical L-shaped parts 72, 72 held on opposite sides of a spacer block 74 by rivets 75, 75. One end portion of this composite link includes ears 78, 78 pivoted by pin 80 to an intermediate portion of lever or handle 64. The other end portion of link 70 includes ears 76, 76 having open-sided grooves 82, 82 providing hooks 84, 84.

A screw block 86 extends transversely from the body section 12. An adjustment screw 88 is threadedly engaged with a drilled and tapped, longitudinal bore 90 in the block 86. The hooks 84 are detachably engaged with the screw head 92.

The line D—D (FIG. 1) is drawn to connect the outer bearing corner of screw head 92 to the movable pin 80. Note that this line D—D is inside the stationary pin 66. This is the stable, overcenter position of the toggle means 54 in which gasket rings 42, 42 are compressed to a degree determined by the screw 88.

Figure 3:
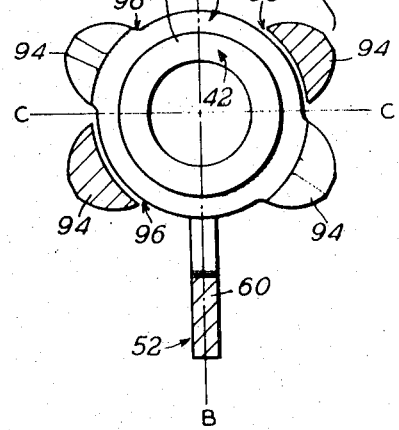
FIG. 3 is a fragmentary cross section of FIG. 1, taken along line 3—3.
Figure 6:
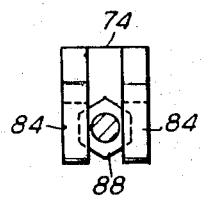
FIG. 6 is a fragmentary, cross-sectional view of FIG. 1, taken along the line 6—6.
Figure 7:
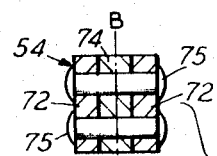
FIG. 7 is a fragmentary, external view of FIG. 1, taken in the direction of the arrows 7—7.

Another important feature of the invention, best shown in FIGS. 1, 3 and 4, is the means for aligning the two body sections and for maintaining them in alignment. This is through the cooperation of the pivot means 52 and sets of guide lugs 94.

Each body section has a pair of guide lugs 94, 94 which extend forwardly beyond the seat 36, and embrace the periphery of the other body section. As shown in FIG. 3, the clearance 96 between the forward end portions of the lugs 94 and the body sections is relatively small to maintain the two body sections in close alignment.

Thus, the body sections are restrained against relative transverse movement, in plane B—B (the plane of FIG. 1) by engagement of the pin 62 in the slots 58. And the body sections are restrained against relative transverse movement, in plane C—C (the plane of FIG. 4), by guide lugs 94. Inasmuch as planes B—B and C—C are displaced 90° from one another (see FIG. 3), relative transverse movement of the body sections 12 and 14 is effectively restrained in all directions by the combination of the pivot means 52 and lugs 94.

Because of the lug arrangement shown, both body sections 12, 14 are identical, except for the pivot means 52 and the toggle means 54. It will be understood that other lug arrangements may be employed. For example, all lugs 94 may be provided on one body section and none on the other.

With this combination of parts positively maintaining the precise alignment of the two body sections, the coupling may be connected and disconnected positively and securely by inexperienced operators under poor lighting conditions, even in the dark.

Hoses 24 and 34 may be connected simply by hooking pin 62 into slots 58, engaging hooks 84 behind the screw head 92, and rotating handle 64 clockwise to the position shown in FIG. 1.

This places handle 64 in a secure, overcenter position and compresses gasket rings 42 sufficiently to hold high-pressure fluid within the coupling. By tightening the screw 88, the compression in the gasket rings can be increased to handle higher pressure fluids.

The foregoing disclosure and description of the invention is illustrative and explanatory thereof and various changes in the size, shape and materials, as well as in the details of the illustrated construction, may be made within the scope of the appended claims without departing from the spirit of the invention.

I claim as my invention:

1. A quick connect and disconnect coupling for connecting hose or the like, comprising:

a pair of tubular body sections adapted to be assembled in axially aligned, confronting, end-to-end relation;

each body section having an annular seat at the confronting end portion;

a resilient, rubberlike gasket ring in fluid-sealing engagement with the seat on each body section, the gasket ring extending forwardly of the body section and being compressibly engageable with its counterpart on the other body section when assembled;

each body section having an open area completely surrounding the gasket ring to prevent accumulation of foreign material between the gaskets when assembled;

detachable pivot means between the body sections on one side of the coupling and detachable toggle means on the opposite side, the pivot means being effective when assembled to restrain relative transverse movement of the body sections in a longitudinal plane containing the pivot and toggle means; and the body sections having guide lugs each of which extends from one body section and is engageable with the other to restrain relative movement between the body sections in a direction transverse to said longitudinal plane;

whereby upon relative movement of the body sections toward and away from one another, about the pivot means, the body sections are guided by the guide lugs precisely to and from an assembled position of axial alignment in which the gasket rings are compressible against one another and their respective seats by tightening the toggle means; and whereby further, the body sections may be completely disassembled and separated by releasing the toggle means.

2. A quick connect and disconnect coupling according to claim 1 in which the toggle means includes an adjustable threaded connection to one of the body sections, the threaded connection being adjustable to vary the compression of the gasket rings when the coupling is assembled.

3. A quick connect and disconnect coupling according to claim 1 in which the pivot means includes transverse extensions of the body sections, one having a pivot pin engageable within an open-ended slot in the other.

4. A quick connect and disconnect coupling according to claim 1 in which the toggle means includes a manually operable lever pivotably mounted on a transverse extension of one body section, an adjustment screw threadedly engaged with the other body section, the adjustment screw having a head which is adjustable lengthwise relative to the body sections, and a link having one end pivoted to an intermediate portion of the lever and having its opposite end detachably engageable with the head of the adjustment screw, the lever being movable to a stable, overcenter position to draw the body sections together and to compress the gasket rings to an extent determined by the adjustment of the screw.

5. A quick connect and disconnect coupling for connecting hose or the like, comprising:

a pair of tubular body sections adapted to be assembled in axially aligned, confronting, end-to-end relation;

each body section having an annular seat at its confronting end portion;

a resilient, rubberlike gasket ring on the seat of each body section and being compressibly engageable with its counterpart on the other body section when the coupling is assembled;

detachable pivot means between the body sections on one side of the coupling and detachable toggle means on the opposite side;

the toggle means being effective to compress the gasket rings together against a common interface while pivoting the body sections about the pivot means;

the pivot means being effective to restrain relative transverse movement of the body sections in one longitudinal plane containing the longitudinal axis of the coupling; and guide lugs each connected to one of the body sections and engageable with the periphery of the other body section to restrain relative transverse movement of the body sections in another longitudinal plane containing the longitudinal axis of the coupling, said planes being at substantially right angles to one another.

* * * * *